United States Patent [19]

Mulchandani et al.

[11] Patent Number: 5,108,767
[45] Date of Patent: Apr. 28, 1992

[54] LIQUID NUTRITIONAL PRODUCT FOR PERSONS RECEIVING RENAL DIALYSIS

[75] Inventors: Rohini P. Mulchandani, Worthington; Judith A. Gluvna, Columbus; Tina M. Knisley, Reynoldsburg; David B. Cockram, Hilliard, all of Ohio

[73] Assignee: Abbott Laboratories, Abbott Park, Ill.

[21] Appl. No.: 712,768

[22] Filed: Jun. 10, 1991

[51] Int. Cl.⁵ .................. A23L 1/302; A23L 1/303; A23L 2/00; A23J 1/00; A61K 37/02
[52] U.S. Cl. ........................... 426/72; 426/73; 426/74; 426/590; 426/656; 426/657; 514/2
[58] Field of Search ............... 514/7, 2; 426/73, 74, 426/590, 657, 656, 72

[56] References Cited

U.S. PATENT DOCUMENTS

| | | | |
|---|---|---|---|
| 4,055,555 | 10/1977 | Badertscher et al. | 260/119 |
| 4,303,580 | 12/1981 | Hidalgo et al. | 260/113 |
| 4,414,238 | 11/1983 | Schmidl | 426/74 |
| 4,753,926 | 6/1988 | Lucas et al. | 426/74 |
| 4,880,912 | 11/1989 | Callison | 530/361 |
| 4,915,962 | 4/1990 | Howard | 426/74 |

FOREIGN PATENT DOCUMENTS 2617016  6/1987  France.

OTHER PUBLICATIONS

U.S. Patent Appln. Ser. No. 07/712,767, filed Jun. 10, 1991, Mulchandani et al. for "Calcium Magnesium Caseinate and Method of Making the Same".
"Specialized Nutrition for Patients with Renal Disease", copyright 1990, Ross Laboratories.

Primary Examiner—Marianne Cintins
Assistant Examiner—Rebecca Cook
Attorney, Agent, or Firm—Lonnie R. Drayer

[57] ABSTRACT

A liquid nutritional product is specially formulated to meet the needs of a person receiving renal dialysis. The caloric distribution, vitamins and minerals, and electrolytes are carefully controlled. The source of magnesium in the product is a calcium magnesium caseinate.

19 Claims, No Drawings

LIQUID NUTRITIONAL PRODUCT FOR PERSONS RECEIVING RENAL DIALYSIS

The present invention relates generally to a liquid nutritional product for persons undergoing renal dialysis, and more specifically to a liquid nutritional product containing a calcium magnesium caseinate and intended for use by persons undergoing renal dialysis.

Currently, about 110,000 persons receive renal dialysis. At the present time there are no commercially available enteral formulas designed specifically for dialysis patients. It is important for a dialysis patient to replace nutrients lost to the dialysate, while controlling intakes of protein, fluids, electrolytes and phosphorus. The nutritional product of the present invention addresses the nutritional needs of renal dialysis patients.

The kidneys perform an amazing variety of excretory, metabolic, regulatory, and endocrine functions. They control fluid and electrolyte homeostasis, excretion of nitrogenous wastes, and synthesis and degradation of several hormones. Chronic renal disease is a group of syndromes associated with the loss of renal function. The degree of impairment varies from mild a symptomatic loss of kidney function to total loss of the kidneys' diverse functions, necessitating either transplantation or dialysis for survival. Although some kidney diseases may be curable through medical or surgical intervention, most patients progress towards end-stage chronic renal failure even after the source of original insult has been removed. Treatment of end-stage renal disease with dialysis or kidney transplantation is expensive, has a number of inherent risks, causes significant morbidity and mortality, and disrupts the patient's lifestyle.

Acute or chronic renal disease impairs the kidneys' ability to maintain a homeostatic plasma composition. When kidney function is comprised to an extent that its large reserve capacity is destroyed, some solutes (e.g., phosphorus, magnesium, urea, and creatinine) can begin to accumulate within the body. To minimize the accumulation of these solutes, either dietary modification (to reduce their supply/production) or dialysis (to remove them from the blood) is necessary. When renal function has decreased to less than about 10% to 5% of normal, the kidneys lose their ability to perform their excretory functions. At this point conservative medical and nutritional interventions become insufficient and some form of renal replacement therapy (dialysis or transplantation) must be instituted to sustain life.

Dietary restrictions are a cornerstone in the medical management of renal patients. The primary goal of diet in end-stage renal disease is to provide adequate nutrients to optimize nutritional status while minimizing uremic symptoms. Dietary management is difficult because renal disease impacts the metabolism and utilization of many nutrients. Control of dietary protein and maintaining nonprotein caloric intake are the highest priorities. Typically, modifications in dietary phosphorus, fluid, potassium, and/or sodium intakes are also necessary to limit their accumulation in the blood or the development of hypertension.

Nutritional management in renal disease presents a number of challenges for clinicians. Because the kidneys are pivotal in maintaining homeostasis within the body, loss of renal function affects nearly all other organ systems. Additionally, renal disease is progressive, necessitating repeated monitoring and modification of therapeutic interventions to compensate for the continuous loss of kidney function. Nutritional interventions in end-stage renal disease have two primary goals: (1) minimize or prevent the characteristic uremic symptoms, and (2) achieve and maintain optimal nutritional status.

The number of restrictions make dietary compliance difficult to attain. The number and severity of dietary restrictions complicate food selection, and patients often must substantially change their eating patterns and possibly consume special foods. Dietary intake studies in renal patients indicate that achieving caloric goals is difficult. Renal disease can both directly and indirectly influence nutritional status. The direct effects result from alteration in the metabolism of specific nutrients. Uremic symptoms of nausea, vomiting, anorexia, malaise, and pruritus may interfere directly with food preparation and consumption by renal patients. The regiment may become nutritionally inadequate, requiring water-soluble vitamin and calcium supplementation to prevent deficiencies.

Compliance with needed dietary restrictions may limit intake of certain nutrients. A low-protein diet limits intake of zinc, iron, calcium, vitamin C, folate, and other B vitamins. Nutrient restrictions also limit the variety of foods consumed, which further comprises dietary adequacy. Food preparation methods and established eating habits often need to be significantly modified to meet nutrient intake goals. In addition to potential vitamin and mineral imbalances, the overall impact of all of the dietary restrictions is frequently a suboptimal energy intake. Insufficient energy intake may further exacerbate uremic symptoms by stimulating catabolism of lean tissue for energy. The accumulation of metabolic by-products can lead to altered nutrient intake.

Because of the number and pervasiveness of dietary restrictions required, a team approach to nutritional intervention is needed. Physicians, dietitians, and other health care professionals must work together to achieve therapeutic nutritional goals.

The primary goal of diet in renal disease is control of energy and nitrogen intake to optimize nutritional status. Dietary protein is controlled to minimize the accumulation of nitrogenous wastes and limit uremic symptoms while providing adequate nitrogen to prevent wasting of lean body mass. The choice of dialysis method influences protein requirements. For example, hemodialysis results in the loss of 1 to 2 g of amino acids per hour of dialysis, while up to 45 g or more may be lost during peritoneal dialysis when complicated by severe peritonitis. Thus, dietary protein recommendations are 1.0 to 1.2 g and 1.2 to 1.5 g of protein/kg body weight (BW) per day during hemodialysis and peritoneal dialysis, respectively. The protein source in the nutritional product of the present invention is casein, a high-biological-value protein. This protein meets the standards established for a high-biological value protein established by the National Academy of Sciences.

Studies suggest that the caloric requirements of dialyzed patients are similar to those of normal persons. Recommended energy intakes for persons undergoing peritoneal dialysis and hemodialysis are similar, at approximately 35 kcal/kg of body weight per day. Therefore, renal diets must be nutrient dense to supply adequate calories while complying with protein, electrolyte, and fluid goals.

Calcium and phosphorus hemeostasis is altered in renal disease because of impaired vitamin D metabolism and the damaged kidney's inability to excrete phosphorus. When glomerular filtration rate (GFR) decreases below 30% of normal, the excretory capacity of the damaged kidneys for phosphorus is surpassed and hyperphosphatemia ensues. The diminished calcium absorption (due to impaired vitamin D formation) and hyperphosphatemia reduce serum calcium, which, in turn, stimulates parathyroid hormone (PTH) secretion, leading to a chronic PTH elevation. Reducing dietary phosphorus below typical intakes (1500 mg/day) helps reduce serum and urinary phosphorus levels. Institution of phosphate binders, which reduce intestinal absorption of phosphorus, effectively lowers serum phosphorus and PTH levels. Calcium salts are effective as phosphate binders and can help normalize serum calcium levels.

The failing kidneys can compensate for normal levels of dietary electrolytes until late in the disease process. Once critical levels of renal damage are reached, however, the electrolyte content of renal diets must be restricted to avoid hypertension, fluid imbalances, and hypokalemia or hyperkalemia.

The kidneys can reduce the fraction of filtered sodium that is reabsorbed to compensate for the loss of renal function. However, as the patient reaches end-stage disease and GFR drops below about 25 to 10 mL/min per 1.73 m$^2$ body surface area (BSA), the kidneys begin to waste sodium. At this stage of renal disease, the ability of damaged kidneys to conserve or waste sodium adequately on very low or very high intakes, respectively, may be comprised.

Loss of renal metabolic, endocrine, and excretory functions impairs the body's ability to maintain normal serum potassium concentrations because it is the primary route for potassium excretion from the body. The typical American potassium intake is 2500 to 3400 mg (64 to 87 mEq) per day. Hypokalemia is not a usual finding in most renal patients because the kidneys can conserve potassium. However, there is an obligatory excretion of approximately 1175 to 1955 mg (30 to 50 mEq) of potassium per day. Potassium usually must be limited to 1565 to 2740 mg (40 to 70 mEq) per day when urine output drops below 1 L/day or GFR to <5 mL/min per 1.72 m$^2$ BSA, if hyperkalemia is to be prevented. The primary cause, in stable patients, of hypokalemia and hyperkalemia, respectively, is inadequate or excessive dietary intakes of potassium.

Vitamin nutritional status may be comprised in renal patients because many foods limited on electrolyte-restricted renal diets are also excellent dietary sources of water-soluble vitamins. In addition, pyridoxine, folic acid, and vitamin C metabolism is known to be altered in renal patients. Although renal patients' requirements for the remaining water-soluble vitamins have not been fully studied, current recommendations are to provide recommended daily allowance (RDA) levels for most vitamins.

Pyridoxine supplementation, at 5 to 10 mg/day of pyridoxine hydrochloride, effectively normalizes serum pyridoxal-5'-phosphate (PLP) levels. Supplementation of diets with 1.0 mg/day of folic acid is suggested, although the folic acid requirements of chronic renal failure (CRF) patients have not been fully elucidated.

Ascorbic acid (vitamin C) in excess of requirements is normally excreted intact in the urine. In renal patients, whereby urinary excretion is limited or absent, metabolism of ascorbic acid to oxalate may be enhanced. Oxalate is an insoluble compound that can precipitate in the kidneys, forming oxalate kidney stones. To minimize the potential for oxalosis, vitamin C intake should be limited to 60 to 100 mg/day in renal patients.

Tissue uptake and utilization of folic acid are also altered in renal patients. Supplementation of diets with 1.0 mg/day of folic acid is suggested, although the folic acid requirements of CRF patients have not been fully elucidated.

Elevated vitamin A levels in renal patients have been reported even in the absence of supplements, and symptoms of clinical toxicity have been reported. Hypervitaminosis A is associated with increased serum calcium, triglycerides, and cholesterol and may heighten susceptibility to fractures. To minimize toxic levels, dietary vitamin A intake should be at or below the RDA in renal patients.

The conversions by the kidney of vitamin D to the most biologically active form, $1,25(OH)_2D_3$, is reduced in renal patients. As a consequence of the calcium imbalance, bone disease and hyperparathyroidism are common findings in patients with advanced renal disease. To minimize the risk of hypercalcemia and calcium phosphate precipitation in the kidney and other tissues, supplementation with vitamin D requires close medical management.

Aluminum accumulation in the brain and bones in renal patients has been suggested as a potential cause of the osteodystrophy and encephalopathy occurring in renal patients. A typical diet provides 2 to 100 mg of aluminum per day. Normally, the intestine is relatively impermeable to aluminum, and most dietary aluminum is excreted in the stool. Persons with renal insufficiency, particularly those receiving aluminum-containing medications, have substantially elevated blood aluminum concentrations because while absorption is unchanged, urinary excretion is greatly reduced. Citrate readily solubilizes aluminum, facilitating both its absorption and distribution throughout the body. Concentrations of both aluminum and citrate are minimized in a nutritional product according to the present invention.

Compared with the nutritional requirements of normal health individuals dialysis patients require more protein, calcium, folic acid and pyridoxine, while the consumption of vitamins A, D and C, and phosphorus, magnesium, sodium, potassium, and fluids typically must be controlled. The nutritional product of the present invention has a modified nutrient profile to help compensate for these abnormalities in nutrient metabolism.

Historically, one of two approaches has been used to nourish dialyzed individuals who are unable to ingest adequate nutrition volitionally. The first has been to use a medical nutritional product designed for nondialyzed renal patients (whose protein requirements are substantially lower than dialyzed patients') and add protein (and, when using most products designed for nondialyzed patients, vitamins, minerals and electrolytes as well) to approximate the nutritional needs of dialyzed persons. This approach is time consuming and necessitates precise calculations. In addition, because all of the known commercially available modular sources of protein contain some phosphorus and electrolytes, the resultant food could still have greater than desired quantities of these nutrients. Alternatively, nutritional products designed to meet the nutrient requirements of "normal" individuals may be used. The disadvantage of this approach is that the nutrient profile is inappropriate for dialyzed renal patients. These products provide excessive quantities of vitamins A, D and C, magnesium, phosphorus, and possible sodium, potassium, and fluid. They also do not meet the increased calcium, pyridoxine, and folic acid requirements so that these nutrients must be supplemented if such products are used.

The process of manufacturing a nutritional product according to the present invention begins with the preparation of two individual slurries. These slurries are then added to a third slurry when contains calcium magnesium caseinate. The resulting blend is homogenized, heat processed, standardized, and terminally sterilized. TABLE I is a bill of materials used in manufacturing a one thousand pound batch of a nutritional product according to the present invention.

TABLE I
BILL OF MATERIALS

| Ingredient | | Amount per 1000 lbs |
|---|---|---|
| Water | | 565.090 lb |
| Sodium Chloride | | 0.719 lb |
| Sodium Citrate | | 0.690 lb |
| Trace Mineral Premix | | 0.1389 lb |
| Zinc Sulfate | 0.06345 lb | |
| Ferrous Sulfate | 0.05413 lb | |
| Manganese Sulfate | 0.01585 lb | |
| Copper Sulfate | 0.00547 lb | |
| Dibasic Calcium Phosphate (diluent) | Q.S. | |
| Potassium Iodide | | 0.00026 lb |
| Calcium Carbonate | | 2.600 lb |
| Sucrose | | 23.400 lb |
| Hydrolyzed Cornstarch | | 180.682 lb |
| Soy Oil | | 8.486 lb |
| High Oleic Safflower Oil | | 76.378 lb |
| Soy Lecithin | | 3.536 lb |
| Oil Soluble Vitamin Premix | | 0.1455 lb |
| Alpha-tocopheryl Acetate | 0.05442 lb | |
| Vitamin A Palmitate | 0.000809 lb | |
| Phylloquinone | 0.000085 lb | |
| Vitamin D3 | 0.0000024 lb | |
| Coconut Oil (carrier) | Q.S. | |
| Sodium Caseinate | | 14.188 lb |
| Calcium Caseinate | | 14.188 lb |
| Potassium Citrate | | 2.413 lb |
| Acid Casein | | 44.276 lb |
| Calcium Hydroxide | | 0.424 lb |
| Magnesium Hydroxide | | 0.456 lb |
| Water Soluble Vitamin Premix | | 0.1102 lb |
| Niacinamide | 0.04266 lb | |
| d-Calcium Pantothenate | 0.02282 lb | |
| Pyridoxine Hydrochloride | 0.01290 lb | |
| Thiamine Hydrochloride | 0.00444 lb | |
| Riboflavin | 0.00391 lb | |
| Folic Acid | 0.00133 lb | |
| Biotin | 0.00067 lb | |
| Cyanocobalamin | 0.00001 lb | |
| Dextrose (carrier) | Q.S. | |
| Carnitine | | 0.265 lb |
| Taurine | | 0.205 lb |
| Sodium Selenite | | 0.00018 lb |
| Ascorbic Acid | | 0.375 lb |
| Choline Chloride | | 0.677 lb |
| Potassium Hydroxide (proc. aid) | | 0.23489 lb |
| Vanilla Flavor | | 2.100 lb |
| Cream Flavor | | 0.900 lb |

A carbohydrate/mineral slurry is prepared by placing the appropriate amount (about 188 lbs/1,000 lbs product) of hot processing water, 155-165° F., in a suitable tank. The minerals are then dissolved in the water with agitation in the following order: sodium chloride, sodium citrate, trace mineral premix, and potassium iodide. The resulting solution should be clear and greenish-yellow in color, and should be maintained at a temperature in the range of 130-145° F. The calcium carbonate and sucrose are added tot he slurry with continued agitation. The hydrolyzed cornstarch is added with agitation. The completed carbohydrate/mineral slurry is maintained, under agitation, at 130-145° F. until added to the blend.

A protein-in-fat slurry is prepared by adding the soy oil and the high oleic safflower oil to a kettle and heating the oil to 130-150° F. under agitation. The soy lecithin is added to the kettle and the oil slurry is agitated until the lecithin is dissolved. With continued agitation, the oil soluble vitamin premix is added to the slurry. The calcium caseinate and sodium caseinate are added to the oil slurry while agitation is maintained. The slurry is maintained at a temperature of 130-150° F. under agitation until the protein-in-fat slurry is added to the blend.

Calcium magnesium caseinate is prepared by heating the required amount of process water (about 355 lbs/1,000 lbs product) to 150-160° F. in a tank. The potassium citrate is added with agitation until dissolved. The acid casein is added under agitation and the slurry takes on a grainy appearance. After 1 minute, the calcium hydroxide and magnesium hydroxide are added to the tank. The temperature is maintained at 150-160° F. The slurry is then held, under agitation, for 8 minutes to allow for neutralization of the acid casein. The pH of the slurry should be 6.4-7.1 and the slurry should have a smooth appearance after the 8 minute hold time. Additional incubation time and/or amounts of calcium hydroxide may be necessary to achieve the specified pH. The resulting calcium magnesium caseinate slurry is held under agitation at 145-155° until blending. The calcium magnesium caseinate is taught in commonly owned U.S. Pat. application Ser. No. 07/712,767 filed on Jun. 10, 1991.

The carbohydrate/mineral slurry and the protein-in-fat slurry are added with agitation to the calcium magnesium caseinate slurry. After a minimum of 5 minutes of agitation, the pH is checked. The pH of the blend should be in the range of 6.4-6.8. If an adjustment of the pH is necessary, 5% potassium hydroxide is used. Do not use citric acid. The blend is held at 130-155° F. until processing.

The blend is emulsified, ultra-high temperature processed (292-294° F. for 5 seconds), then homogenized using a two-stage homogenizer at 4,000±100 psig at the first stage and 500±100 psig at the second stage. The processed blend is then cooled to 35-45° F. and held at this temperature under agitation until standardization.

A water soluble vitamin solution is prepared by placing the appropriate amount (about 8.0 lbs/1,000 lbs product) of cool (50-100° F.) process water in a suitable tank. The vitamins are then added with agitation in the following order: water soluble vitamin premix, carnitine, taurine, sodium selenite, ascorbic acid, and choline chloride. A sample is collected for pH determination. Potassium hydroxide is added to the vitamin solution until a pH in the range 5.0-10.0 is obtained, preferably at the low end of the pH range. Once the pH is determined to be acceptable, the vitamin solution is transferred, with agitation, to the blend.

A flavor solution is prepared by adding the vanilla and cream flavors to the appropriate amount (about 7.0 lbs/1,000 lbs product) of cool (50-100° F.) processing water. After mixing, the flavor solution is transferred to the blend and agitated.

A trial sterilization is performed to determine the final amount of potassium hydroxide and water to be added to the blend so that finished product specifications of pH 6.5-7.0 and 35.5-36.2% total solids are obtained. The specified amounts of potassium hydroxide (as needed) and water (about 7.0 lbs/1,000 lbs product), determined from the trial sterilization data, are added with agitation to the blend. The completed blend is then placed into 8 ounce cans and terminally sterilized. The finished product is packaged as a ready-to-serve liquid.

A nutritional product according to the present invention is a moderate-protein, calorically dense product for patients with renal conditions requiring fluid and electrolyte restrictions. The nutritional product of the present invention meets the unique nutrient requirements of dialyzed patients with acute or chronic renal conditions and can be used either as an oral supplement to suboptimal diets or as a primary source of nutrition. The nutritional product of the present invention provides patients with renal disease with 100% of suggested nutrient intakes in four 8 fluid ounce servings per day (947 mL; 1,900 kcal). The nutrient profile of a nutritional product according to the present invention is set forth in Table II.

TABLE II

| Nutrient | Dietary Goals for Dialysis Patients | per 8 fl oz | per 1900 kcal | per 1000 mL |
|---|---|---|---|---|
| Nutrient Profile | | | | |
| Calories | ≧35 kcal/kg | 475 | 1900 | 2000 |
| Protein, g | 10-1.5 g/kg | 16.6 | 66.4 | 69.9 |
| Carbohydrate, g | 31%-51% of kcal | 51.1 | 204.4 | 215.2 |
| Fat, g | 40%-55% of kcal | 22.7 | 90.8 | 95.6 |
| Water, mL | 750-1500 | 167 | 668 | 703 |
| Volume, mL | No recommendation | 237 | 947 | 1000 |
| Taurine, mg | Mixed diet: 150 | 38 | 150 | 160 |
| L-carnitine, mg | Mixed diet: 150 | 62 | 250 | 261 |
| Selenium, mcg | Mixed diet: 108 | 24 | 96 | 101 |
| Vitamin A, IU | No supplements | 250 | 1000 | 1053 |
| Vitamin D, IU | Individualized | 20 | 80 | 84 |
| Vitamin E, IU | US RDA: 30 | 11.3 | 45.2 | 47.6 |
| Vitamin K, mcg | RDA: 45-80 | 20 | 80 | 84 |
| Vitamin C, mg | 60-100 | 25 | 100 | 105 |
| Folic acid, mcg | 1000 | 250 | 1000 | 1053 |
| Thiamine, mg | 1.5 | 0.6 | 2.40 | 2.53 |
| Riboflavin, mg | 1.8 | 0.68 | 2.72 | 2.86 |
| Pyridoxine (vitamin B6), mg | 8.16 | 2.04 | 8.16 | 8.59 |
| Vitamin B12, mcg | 3 | 2.4 | 9.6 | 10.1 |
| Niacin, mg | 10 | 8.0 | 32.0 | 33.7 |
| Choline, mg | No recommendation | 150 | 600 | 632 |
| Biotin, mcg | US RDA: 300 | 120 | 480 | 505 |
| Pantothenic acid, mg | US RDA: 10 | 4.0 | 16.0 | 16.8 |
| Sodium, mg | 750-1000 | 197 | 788 | 829 |
| Sodium, mEq | 32.6-43.5 | 8.6 | 34.3 | 36.1 |
| Potassium, mg | 1565-2740 | 251 | 1004 | 1057 |
| Potassium, mEq | 40.0-70.0 | 6.4 | 25.7 | 27.0 |
| Chloride, mg | No recommendation | 240 | 960 | 1011 |
| Calcium, mg | 1400-1600 | 326 | 1304 | 1373 |
| Phosphorus, mg | 8-17 mg/kg | 163 | 652 | 686 |
| Magnesium, mg | 200-300 | 50 | 200 | 211 |
| Iodine, mcg | US RDA: 150 | 37.5 | 150.0 | 157.9 |
| Manganese, mg | US RDA: 2 | 1.25 | 5.00 | 5.26 |
| Copper, mg | US RDA: 2 | 0.5 | 2.0 | 2.1 |
| Zinc, mg | 15 | 5.6 | 22.4 | 23.6 |
| Iron, mg | ≧10-18 | 4.5 | 18.0 | 18.9 |

The caloric distribution of the nutritional product is: protein 12% to 19% more preferably, 12% to 16%, and most preferably about 14%; fat 30% to 55%, more preferably 40% to 50%, and most preferably about 43%; and carbohydrate 30% to 55%, more preferably 40% to 50%, and most preferably about 43%. The caloric density is 1.5 to 2.5 kcal/ml, preferably about 2.0 kcal/mL (59.4 kcal/fl oz), which minimizes the volume to meet the caloric goals of a dialyzed patient.

The protein content of the product is in the range of 14.25 to 22 g/8 fl oz, preferably about 16.6 g/8 fl oz, which provides adequate protein to prevent catabolism of tissue proteins, yet minimizes exacerbation of uremic symptoms. The total calorie-nitrogen and nonprotein calorie-nitrogen ratios are 183:1 and 157:1, respectively. At 35 kcal/kg of body weight per day, the new product provides 1.2 g protein/kg of body weight per day, which is the recommended level for dialysis patients. Calcium caseinate, sodium caseinate, and a unique calcium magnesium caseinate (which will be described hereinafter in detail) are the protein sources in the nutritional product which meet the standards for high quality proteins set by the National Academy of Sciences. The new product is gluten free. Table III sets forth the typical amino acid profile of a nutritional product according to the best mode of the invention.

TABLE III

| Amino Acid | g/100 g Protein | High-Quality Protein (g/100 g) |
|---|---|---|
| Typical Amino Acid Profile | | |
| Essential | | |
| Histidine | 2.6 | 1.7 |
| Isoleucine | 4.6 | 4.2 |
| Leucine | 9.2 | 7.0 |
| Lysine | 7.0 | 5.1 |
| Methionine & cystine | 3.3 | 2.6 |
| Phenylalanine & tyrosine | 9.3 | 7.3 |
| Threonine | 4.1 | 3.5 |
| Tryptophan | 1.3 | 1.1 |
| Valine | 5.9 | 4.8 |
| Nonessential | | |
| Alanine | 2.9 | |
| Arginine | 3.2 | |
| Aspartic acid | 7.0 | |
| Glutamic acid | 22.4 | |
| Glycine | 1.8 | |
| Proline | 10.6 | |
| Serine | 5.6 | |

The carbohydrate content of the new nutritional product is moderate, in the range of 35 to 66 g/8 fl oz, preferably about 41.1 g/8 fl oz. A blend of about 88% hydrolyzed cornstarch and about 12% sucrose minimizes the sweetness of the product while enhancing the flavor of the product. The product is preferably lactose free.

The new nutritional product has a moderate fat content of 15 to 30 g/8 fl oz, preferably about 22.7 g/8 fl oz which is appropriate for persons with impaired glucose tolerance or who are absorbing glucose from dialysate and does not raise serum lipid levels. A blend of about 90% high-oleic safflower oil and about 10% soy oil provides about 4.2% and about 9.3% of total calories as saturated and polyunsaturated fatty acids, respectively, levels meeting American Heat Association recommendations. It will be recognized by those skilled in the art that other satisfactory oil blends may be used without departing from the scope of the invention; e.g. anile oil and marine oils. The typically fatty acid profile of a nutritional product according to the best mode of the invention is set forth in Table IV.

TABLE IV

| Typical Fatty Acid Profile | |
| --- | --- |
| Fatty Acid | % Total Fatty Acids |
| Essential | |
| Linoleic | 20.8 |
| Linolenic | 0.9 |
| Nonessential | |
| Caprylic | Trace |
| Capric | Trace |
| Lauric | 0.2 |
| Myristic | 0.2 |
| Palmitic | 6.1 |
| Stearic | 2.6 |
| Oleic | 68.7 |
| Arachidic | 0.6 |

1,900 kcal (947 ml, or four 8 fl oz servings) of the new nutritional product provides at least 100% of recommended intakes for vitamins and minerals for persons with renal disease. 1,900 kcal (947 ml, or four 8 fl oz servings) of the new nutritional product provides at least 100% of the U.S. Recommended Daily Allowances (US RDA) for all vitamins and minerals except phosphorus, magnesium, vitamin A, and vitamin D which need to be limited on renal diets.

An 8 fl oz serving of the product contains about 1.75 to 2.8 mg, preferably about 2.04 mg of vitamin $B_6$ (pyroxidine) such that four 8 fl oz servings are supplemented with about 8.16 mg of vitamin $B_6$ (pyroxidine), an amount equivalent to 10 mg of pyroxidine hydrochloride, the recommended intake for persons with renal failure.

An 8 fl oz serving of the product contains about 200 to 275 mcg, preferably about 250 mcg of folic acid, such that four 8 fl oz servings provides about 1,000 mcg of folic acid to meet the increased requirements of renal patients.

Because of the potential for oxalosis, an 8 fl oz serving of the product provides about 15 to 60 mg, and preferably only about 25 mg of vitamin C, such that four 8 fl oz servings provides only about 100 mg of vitamin C, a level appropriate for patients with renal disease.

An 8 fl oz serving of the product contains not more than 500 and preferably about 250 IU of vitamin A, and not more than 40 and preferably about 20 IU of vitamin D. Therefore, four 8 fl oz servings of the product provides only about 1,000 IU of vitamin A and about 80 IU of vitamin D (20% of US RDAs) because metabolism of these vitamins is abnormal in patients with renal disease.

An 8 fl oz serving of the product contains about 225 to 420 mg, preferably about 326 mg of calcium and about 125 to 210 mg, preferably about 163 mg of phosphorus. Therefore, four 8 fl oz servings of the product provides about 130% of the US RDA for calcium, and about 65% of the US RDA for phosphorus. The 2:1 calcium-to-phosphorus ratio helps optimize calcium and phosphorus balance in renal patients.

An 8 fl oz serving of the product contains about 25 to 75 mg, preferably about 50 mg of magnesium. Therefore four 8 fl oz servings of the product provides only about 200 mg of magnesium (50% of the US RDA to minimize the risk of hypermagnesemia. The necessity to incorporate the magnesium in of the product presented a major obstacle which could only be overcome by the development of a new ingredient in the form of a calcium magnesium caseinate. The calcium magnesium caseinate is the subject U.S. Pat. application Ser. No. 07/712,767 filed Jun. 10, 1991.

Concurrent consumption of large quantities of citrate and aluminum must be avoided in renal patients. Citrate intake should be limited because it greatly increases the absorption of aluminum from the diet. Aluminum is a problem for renal patients because the major route for excretion of aluminum from the body is via the urine. In renal disease, urinary aluminum excretion is rapidly diminished and patients can develop high levels of aluminum in their blood. High aluminum levels have been implicated in causing both a debilitating bone disease which is frequently a problem in renal patients and an encephalopathy (dialysis dementia) which is another condition sometimes exhibited by individuals with renal disease. Because aluminum is found in many medications (such as phosphate binders and anti-ulcer medications which many of these people receive) and citrate dramatically increases aluminum absorption, current recommendations are not to concurrently administer sources of both. Although the aluminum content of a nutritional product for renal dialysis patients may be quite low, a low citrate content is desirable to minimize the absorption of any aluminum in other food or medications which the individual may concurrently by receiving.

Another item that should be limited in the diet of a person receiving renal dialysis is magnesium. Magnesium that is absorbed in the digestive tract is largely excreted by the kidneys. For most patients, magnesium is not a major dietary concern because when dietary protein intake is reduced, dietary magnesium is also, in effect, reduced because the best sources of magnesium are meat, poultry, fish and dairy products. When a person consumes a medical nutritional product, with a low protein content and meeting "normal" magnesium requirements, it is possible for magnesium to begin to accumulate in the blood. This appears to be particularly true if the individual in question is an infant or child (where magnesium requirements are lower on a per calorie basis than in adults). In summary, magnesium has to be limited to prevent hypermagnesemia (excess blood magnesium levels) from developing in some patients.

Many prior art liquid nutritional products utilize magnesium chloride, magnesium sulfate, or dibasic magnesium phosphate for magnesium fortification. When developing a new formulation for renal patients on dialysis, the above sources could not be used because: (1) magnesium chloride and magnesium sulfate both significantly raise the citrate demand of a formulation and citrate is one of the restricted nutrients in a product for renal dialysis patients, and (2) the protein sources in the product provide all of the required phosphorus eliminating the need for phosphorus supplementation. Magnesium citrate could not be used because of citrate limitations and attempts to incorporate magnesium carbonate resulted in a product which was unsatisfactory because the final pH of the product was too high, stability was somewhat unpredictable during processing, and the product had a darker than normal color after sterilization. Additionally, magnesium carbonate and magnesium citrate are not suitable magnesium sources for the product because they are insoluble salts which settle to the bottom of the product container during shelf storage. The sediment, so formed, can be firm depending on the age of the product, thus preventing the nutrients in the sediment from being shaken back into suspension in the product. In turn, the amount of specific nutrients delivered to the patient during oral or tube feeding is reduced. An experiment was run to attempt to use a magnesium caseinate obtained from New Zealand Milk Products but it would not disperse in water, and when the magnesium caseinate was dispersed in oil and then added to the product the pH of the product was unacceptable and the viscosity was unacceptably high, in excess of 1,000 cps. The sample of magnesium caseinate obtained from New Zealand Milk Products was not available in commercial lots and the method used in manufacturing the magnesium caseinate is not publicly known. So a "new" non-chloride and non-phosphate containing source of magnesium had to be developed.

One method of overcoming the problems discussed in the foregoing paragraph would be to add the desired amount of magnesium to the product mix in the form of magnesium hydroxide, magnesium carbonate or magnesium oxide or any combination thereof, and thereafter adjust the pH of the product mix to be in the desired range by adding an appropriate amount of lactic acid. However, a solution to the problem which is preferred by the inventors is set forth in more detail hereinafter.

A specific new ingredient was developed to meet the formulation needs of a new product intended for use by renal patients undergoing dialysis. The new ingredient is manufactured using at least one material selected from the group consisting of calcium hydroxide, calcium carbonate and calcium oxide and at least one material selected from the group consisting of magnesium hydroxide, magnesium carbonate and magnesium oxide to convert acid casein to a calcium magnesium caseinate. As used herein and in the claims a calcium magnesium caseinate is understood to mean a caseinate having either a greater amount of calcium atoms or a greater amount of magnesium atoms, although in a most preferred embodiment the caseinate contains slightly more calcium atoms than magnesium atoms.

Casein, the principal protein in milk, can be isolated in various forms fairly easily by insolubilization. The special ingredient is concerned only with acid casein. The expression "acid casein" is used in its broad sense and covers both traditional acid casein directly obtained by acidifying milk, and acid caseins obtained indirectly, such as for example a re-acidified rennet casein. Acid casein in a commercial product, and the acid casein used in the examples set forth herein was obtained from New Zealand Milk Products and had a 30 mesh particle size. Other acid caseins that are commercially available are New Zealand Lactic Casein, (30 mesh); New Zealand Lactic Casein (80 mesh); Australian Hydrochloric Casein, (30 mesh), and Irish Hydrochloric Casein, (30 mesh). All of the aforementioned caseins may be purchased with different particle sizes (mesh sizes). These acid caseins are for illustrative purposes only, and are not intended to limit the present invention. The smallest particle size of acid casein should be used when possible. A smaller particle size decreases the time required to neutralize the acid casein. Preferably the acid casein has been size-reduced into particles of constant and appropriate grain size (i.e., 30 mesh or smaller).

There has been interest in solubilizing acid caseins in water without any major difficulties, and in converting acid caseins into a form in which they can be easily stored and transported, i.e., into powder form. For example, U.S. Pat. No. 4,055,555 to Badertscher et al. teaches that powdered sodium caseinate or a homogeneous solution of caseinate is prepared by providing an aqueous medium which may be pure water or an aqueous solution containing various ingredients, such as salts, sugars, colorants, flavorings, soluble proteins, especially lactalbumin (for example an aqueous medium of whey type), etc. The acid casein is added to the aqueous medium and allowed to age. After ageing, the neutralizing agent is added to provide the desired suspension. If a powder is desired the suspension is dried. Not only is the solubilization and neutralization of casein according to the teaching of the Badertscher patent temperature dependent, but it also requires a gradual heating process.

U.S. Pat. No. 4,880,912 to Callison teaches an expedited process for the dispersion and neutralization of acid caseins in the manufacture of liquid caseinate that reduces the time and cost variables of the method taught in the Badertscher patent. The process taught by Callison comprises the initial addition of a solubilizing agent to an aqueous solution with a temperature of about 120° F. to about 165° F. prior to the addition of acid casein and a neutralizing agent.

Neither Badertscher et al. or Callison teaches or suggests the desirability of making a calcium magnesium caseinate, they are both concerned merely with means for converting acid casein to a more suitable form for use in nutritional products, not with employing the casein as a means for solving the above described problems in adding magnesium to a nutritional product.

The special ingredient provides a convenient, easy-to-use approach to incorporating all of the needed magnesium and some of the calcium into a formulation, with restricted levels of citrate, chloride and electrolytes, in a bound, non-sedimentable form while maintaining other nutrients within desired specifications. The approach also allows the user to vary the ratio of calcium:-magnesium in the resulting caseinate as desired. A caseinate may be manufactured using only a magnesium salt as the neutralizing agent such that the result is a magnesium caseinate. A nutritional product according to the present invention could be manufactured using a smaller amount of acid casein and using only at least one material selected from the group consisting of magnesium hydroxide, magnesium carbonate and magnesium oxide as the neutralizing agent. In such a procedure the key is to use only enough acid casein as is required to bind the quantity of magnesium desired in the product. However, in the most preferred embodiment, which is suitable for use in the nutritional product of the present invention for persons undergoing renal dialysis, the caseinate is 50-60%, more preferably 5-57% and most preferably about 56.5% calcium caseinate, and 40-50%, more preferably 42-45%, and most preferably about 43.5% magnesium caseinate. The finished product made with the caseinate is stable to routine processing and sterilization, and possesses acceptable physical stability including color and pH.

As set forth in the foregoing detailed description of the best mode for manufacturing the nutritional product of the present invention acid casein which has been dispersed in hot water, is neutralized by at least one material selected from the group consisting of magnesium hydroxide, magnesium carbonate and magnesium oxide and at least one material selected from the group consisting of calcium hydroxide, calcium carbonate and calcium oxide. To facilitate the use of the calcium magnesium caseinate in a nutritional product the final pH of the resulting caseinate solution should be in the range of 6.4–7.1, preferably in the range of 6.6 to 6.9. The amount of each of the starting materials used in the conversion process is dictated by 1) the formulation requirements for magnesium, protein, water, and to a lesser degree calcium, and 2) the need to raise the pH to at least 6.4 to neutralize the specific amount of acid casein/citrate solution with specific hydroxide, carbonate or oxide salts to the corresponding caseinate. The ratio of calcium:magnesium in the final caseinate solution can be varied by changing the amount of the corresponding hydroxide, carbonate or oxide salts added to the acid casein solution, as long as the final pH of the caseinate solution is within the desired range specific above. The calcium magnesium is then blended with other ingredients to formulate a nutritional product that 1) is stable to routine processing and sterilization, 2) provides all of the magnesium and some of the calcium requirements of the product in a bound form, and 3) minimizes magnesium and some calcium "fallout" due to mineral sedimentation in the container during shelf storage of the finished product. Sedimentation would occur if insoluble salts such as carbonates or phosphates of calcium and magnesium where used to meet formulation needs.

In the preferred embodiment a calcium magnesium caseinate is manufactured by a process that ages and neutralizes the acid casein in a solution with an initial temperature of approximately 115° F. to 170° F., preferably about 120° to 165° F. The pH of the water is generally above 7 and as high as 9. The pH of the water is dependent on the locale. Various communities have water of different pH's. The preferred water pH is approximately 7.5. As taught by U.S. Pat. No. 4,880,912 the aqueous medium to which the acid casein is added contains a solubilizing agent and is at a temperature of 115° to 170° F. The solubilizing agent is a citrate selected form the group consisting citrates of potassium, calcium and sodium. Potassium citrate is the most preferred, especially if the caseinate will be used as an ingredient in a nutritional product for a person undergoing renal dialysis because it accepts the acid casein readily and causes the wetting out (ageing) of the acid casein to be almost instantaneous. Calcium citrate is the least preferred citrate to use because of its insolubility. The addition of the citrates to the water before adding the acid casein provides a substantially quick and complete ageing of the acid casein. Furthermore, the addition of acid casein to the citrate solution, as opposed to pure water, allows the use of a temperature exceeding 100° F. The citrate causes an immediate increase in the pH of the solution. Subsequent to the acid casein addition to the citrate solution, 1 to 2% of the acid casein dissolves and actually begins to neutralize before the addition of the neutralizing agents.

The citrate is added to the water and i the range of 1.2 to 8 parts by weight of citrate to 100 parts by weight of the acid casein powder, except that potassium citrate may be added to the solution in smaller amounts. The preferred range is 1.2 to 5.6 parts by weight potassium citrate to 100 parts by weight acid casein. The use of smaller amounts of potassium citrate, i.e., less than about 1.5 parts, generally increases the time required to age the acid casein. Furthermore, the use of less potassium citrate causes the acid casein slurry to require more agitation to keep the casein suspended before the addition of the neutralizing agents to effectuate the acid casein neutralization. The potassium citrate solution has a pH range from about 8.0 to about 8.5. The citrate is allowed to dissolve; this normally takes 10 to 30 seconds. On a commercial basis the citrate will be added over a period of 1 to 3 minutes, preferably 1.5 to 2.5 minutes. Then, the solution is allowed to stand for a period of 0.5 to 2 minutes, preferably 0.5 to 1.5 minutes before adding the casein.

The acid casein is added to the citrate solution which is at a temperature in excess of 100° F. and less than 170° F. The acid casein used may be of the type that is soluble in lactic, hydrochloric, or sulfuric acid. The temperature is maintained and the acid casein is allowed to age for up to 10 minutes. Hence, the ageing of the casein only requires up to 10 minutes. The time required for the acid casein addition depends on the quantity being added. The addition should be as quick as possible and generally takes between 10 seconds and 5 minutes. The preferred range is from about 15 to 90 seconds. The time required for ageing (wetting) the acid casein ranges from zero (0) to 10 minutes and preferably takes place in about 10 to 90 seconds. The solution is agitated during the ageing (wetting) process.

After an aged casein aqueous medium has been made (a) at least one substance selected from the group consisting of magnesium hydroxide, magnesium carbonate and magnesium oxide, and (b) at least one substance selected from the group consisting of calcium hydroxide, calcium carbonate and calcium oxide is then added to the acid casein slurry to effectuate neutralization. The neutralization usually takes between 2 to 30 minutes, with less time being required when the smaller size of acid casein is used. The preferred neutralization time is from 2 minutes to 10 minutes, although in some embodiments the neutralization time to reach a pH in the desired range may be up to thirty (30) minutes.

The result of the above described process is ready-to-use liquid calcium magnesium caseinate. If powdered caseinate is desired, the liquid calcium magnesium caseinate is converted to powder by drying.

The level of solids in the calcium magnesium caseinate slurry by weight should preferably be no greater than about 14%. The slurries with 15% and 17% total solids by weight were very thick, and may be very difficult and inefficient to pump through most manufacturing systems. Of course, in a manufacturing system where the slurry would be dumped into a blend under extreme agitation higher levels of solids could be used.

The electrolyte levels of the new product are kept low to facilitate individualization of intake based on dialysis regimen, residual renal function, underlying disease, and other dietary sources of sodium and potassium. Because of the number of clinical factors that influence electrolyte requirements, nutritional care of dialysis patients must be individual and electrolyte intakes adjusted accordingly. An 8 fl oz serving of the new product contains: about 150 to 240 mg, preferably about 197 mg of sodium; about 200 to 280 mg, preferably about 251 mg of potassium; and about 175 to 325 mg, preferably about 240 mg of chloride. Therefore, four 8 fl oz servings of the product contains about: 788 mg (34.4 mEq) of sodium; about 1,004 mg (25.7 mEq) of potassium; and about 960 mg (27.1 mEq) of chloride.

Renal patients may have low plasma carnitine levels and low levels of serum high-density lipoprotein (HDL), as well as elevated levels of serum triglycerides. Carnitine supplementation may help to lower triglyceride levels in the these patients. An 8 fl oz serving of the new product contains about 20 to 250 mg, preferably about 52 mg of L-carnitine. Therefore, four 8 fl oz servings of the new product provides about 250 mg of L-carnitine. a level slightly higher than that obtained from typical diets to help replete plasma carnitine pools.

An 8 fl oz serving of the new product contains about 18 to 40 mcg. preferably about 24 mcg of selenium, such that four 8 fl oz servings of the product contains about 96 mcg of selenium, a quantity within the range of intakes for typical American diets.

While the formulation of the product set forth herein does not contain a source of dietary fiber, it is understood that a source of dietary fiber could be added to the formulation without departing from the scope of the present invention.

The new product has a moderate osmolality of under 750 mosm/kg water, preferably about 635 mosm/kg water. The renal solute load of the new product is moderate. in the range of about 490.3 mosm/L.

Inasmuch as the new product may be used either drunk or tube fed it preferably has a viscosity of not greater than 130 cps, preferably not greater than 120 cps. Such a viscosity should allow gravity tube feeding using a size 10 French or larger tube, and for pump-administered feedings a size 8 French or larger tube may be used.

The foregoing description is for purposes of illustration rather than limitation of the scope of protection accorded with this invention. The latter is to be measured by the following claims, which should be interpreted as broadly as the invention permits.

We claim:

1. A liquid nutritional product containing protein, fat, carbohydrate, vitamins and minerals comprising in an 8 fluid ounce serving of the product:
   (a) about 14.25 g to about 22 g of protein;
   (b) about 150 mg to about 240 mg of sodium;
   (c) about 200 mg to about 280 mg of potassium;
   (d) about 175 mg to about 325 mg of chloride;
   (e) about 25 mg to about 75 mg of magnesium;
   (f) about 225 mg to about 420 mg of calcium;
   (g) about 125 mg to about 210 mg of phosphorus;
   (h) about 1.75 mg to about 2.8 mg of vitamin B6;
   (i) about 200 mcg to about 275 mcg of folic acid;
   (j) about 15 mg to about 50 mg of vitamin C;
   (k) not more than about 500 IU of vitamin A; and
   (l) not more than about 40 IU of vitamin D;
   (m) about 355 to 593 calories;
   wherein the magnesium is present solely in the form of calcium magnesium caseinate.

2. A liquid nutritional product according to claim 1 wherein the caloric distribution of the product is: about 12% to 19% protein; about 40% to 55% fat; and about 31% to 51% carbohydrate.

3. A liquid nutritional product according to claim 1 wherein an 8 fluid ounce serving of the product provides about 35 g to about 66 g of carbohydrate.

4. A liquid nutritional product according to claim 1 wherein an 8 fluid ounce serving of the product provides about 15 g to about 30 g of fat.

5. A liquid nutritional product according to claim 1 wherein the product has a viscosity of not greater than about 130 cps.

6. A liquid nutritional product according to claim 1 wherein an 8 fluid ounce serving of the product further comprises about 18 mcg to about 40 mcg of selenium.

7. A liquid nutritional product according to claim 1 wherein an 8 fluid ounce serving of the product further comprises about 20 mg to about 120 mg of L-carnitine.

8. A liquid nutritional product according to claim 1 further comprising dietary fiber.

9. A liquid nutritional product containing protein, fat, carbohydrate, vitamins and minerals comprising in an 8 fluid ounce serving of the product:
   (a) about 14.25 g to about 22 g of protein;
   (b) about 140 mg to about 240 mg of sodium;
   (c) about 200 mg to about 280 mg of potassium;
   (d) about 175 mg to about 325 mg of chloride;
   (e) about 25 mg to about 75 mg of magnesium;
   (f) about 225 mg to about 420 mg of calcium;
   (g) about 125 mg to about 210 mg of phosphorus;
   (h) about 1.75 mg to about 2.5 mg of vitamin B6;
   (i) about 200 mcg t about 275 mcg of folic acid;
   (j) about 25 mg of vitamin C;
   (k) not more than about 500 IU of vitamin A; and
   (l) not more than about 40 IU of vitamin D;
   (m) about 355 to 593 calories;
   wherein the magnesium is present in the form of a calcium magnesium caseinate.

10. A liquid nutritional product according to claim 9 comprising in an 8 fluid ounce serving of the product.
    (a) about 16.6 g of protein;
    (b) about 197 mg of sodium;
    (c) about 251 mg of potassium;
    (d) about 240 mg of chloride;
    (e) about 50 mg of magnesium;
    (f) about 326 mg of calcium;
    (g) about 163 mg of phosphorus;
    (h) about 2.04 mg of vitamin B6;
    (i) about 250 mcg of folic acid;
    (j) about 25 mg of vitamin C;
    (k) not more than about 250 IU of vitamin A; and
    (l) not more than about 20 IU of vitamin D.

11. A liquid nutritional product according to claim 9 wherein the caloric distribution of the product is: about 12% to 19% protein; about 4% to 55% fat; and about 31% to 51% carbohydrate.

12. A liquid nutritional product according to claim 9 wherein the source of the protein comprises caseinates.

13. A liquid nutritional product according to claim 9 wherein an 8 fluid ounce serving of the product provides about 35 g to about 66 g of carbohydrate.

14. A liquid nutritional product according to claim 9 wherein an 8 fluid ounce serving of the product provides about 15 g to about 30 g of fat.

15. A liquid nutritional product according to claim 9 wherein the product has a viscosity of not greater than about 130 cps.

16. A liquid nutritional product according to claim 9 wherein an 8 fluid ounce serving of the product further comprises about 18 mcg to about 40 mcg of selenium.

17. A liquid nutritional product according to claim 9 wherein and 8 fluid ounce serving of the product further comprises about 20mg to about 120 mg of L-carnitine.

18. A liquid nutritional product according to claim 9 further comprising dietary fiber.

19. A liquid nutritional product according to claim 9 wherein the calcium magnesium caseinate comprises about 50-60% calcium caseinate and about 40-50% magnesium caseinate.

* * * * *

UNITED STATES PATENT AND TRADEMARK OFFICE
CERTIFICATE OF CORRECTION

PATENT NO. : 5,108,767                                      Page 1 of 2

DATED     : April 28, 1992

INVENTOR(S) : Rohini P. Mulchandani, Judith A. Gluvna, Tina M. Knisley and David B. Cockram It is certified that error appears in the above-identified patent and that said Letters Patent is hereby corrected as shown below:

```
Column  1, Line 24-25, "a symptomatic" should be  --asymptomatic--
Column  1, Line 38,    "comprised"     should be  --compromised--
Column  2, Line 18-19, "regiment"      should be  --regimen--
Column  2, Line 26,    "comprises"     should be  --compromises--
Column  3, Line 33,    "comprised"     should be  --compromised--
Column  3, Line 50,    "comprised"     should be  --compromised--
Column  4, Line 44,    "health"        should be  --healthy--
Column  5, Line 4,     "possible"      should be  --possibly--
Column  5, Line 11,    "when"          should be  --which--
Column  6, Line 2,     "tot he"        should be  --to the--
Column  6, Line 41,    "bein"          should be  --be in--
Column  8, Line 62,    "Heat"          should be  --Heart--
Column  8, Line 66,    "typically"     should be  --typical--
Column 12, Line 51,    "5-57%"         should be  --55-57%--
Column 13, Line 3,     "1)the"         should be  --1) the--
Column 13, Line 13,    "specific"      should be  --specified--
Column 13, Line 14,    "magnesium is"  should be  --magnesium caseinate is--
Column 13, Line 23,    "where"         should be  --were--
Column 13, Line 55,    "andi"          should be  --and in--.
Column 16, Line 17,    "t"             should be  --to--.
```

UNITED STATES PATENT AND TRADEMARK OFFICE
CERTIFICATE OF CORRECTION

PATENT NO. : 5,108,767
DATED : April 28, 1992
INVENTOR(S) : Rohini P. Mulchandani, Judith A. Gluvna, Tina M. Knisley and David B. Cockram It is certified that error appears in the above-indentified patent and that said Letters Patent is hereby corrected as shown below:

Column 16, Line 40, "4%" should be --40%--.

Signed and Sealed this

Thirty-first Day of August, 1993

Attest:

BRUCE LEHMAN

Attesting Officer     Commissioner of Patents and Trademarks